(12) United States Patent
Ito et al.

(10) Patent No.: US 11,643,109 B2
(45) Date of Patent: May 9, 2023

(54) VEHICLE CONTROL SYSTEM, VEHICLE CONTROLLER DEVICE AND VEHICLE CONTROL METHOD

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 16/906,419

(22) Filed: Jun. 19, 2020

(65) Prior Publication Data
US 2021/0024089 A1    Jan. 28, 2021

(30) Foreign Application Priority Data

Jul. 23, 2019 (JP) .............................. JP2019-135287

(51) Int. Cl.
*B60W 60/00* (2020.01)
*G05D 1/00* (2006.01)

(52) U.S. Cl.
CPC ....... *B60W 60/0016* (2020.02); *G05D 1/0011* (2013.01); *B60W 2420/42* (2013.01); *B60W 2555/20* (2020.02); *B60W 2556/10* (2020.02); *B60W 2556/50* (2020.02)

(58) Field of Classification Search
CPC ......... B60W 60/0015; B60W 60/0016; B60W 60/005; B60W 60/0051; B60W 60/0059; B60W 2420/42; B60W 2420/403; B60W 2552/50; B60W 2554/20; B60W 2555/20; B60W 2556/10; B60W 2556/45; B60W 2556/50; G05D 1/0011; G05D 1/0088;
(Continued)

(56) References Cited

U.S. PATENT DOCUMENTS 9,816,831 B2 * 11/2017 Fischer .............. G01C 21/3667
9,964,948 B2    5/2018 Ullrich et al.
10,807,591 B1 * 10/2020 Kentley-Klay ........ G08B 21/10
(Continued)

FOREIGN PATENT DOCUMENTS

DE    102016224368 A1 *  6/2018
JP      2018-022353 A    2/2018
(Continued)

OTHER PUBLICATIONS

Machine translation of foreign patent document DE 102016224368 (Published Jun. 2018) retrieved from WIPO Patentscope (Year: 2018).*

*Primary Examiner* — Russell Frejd
*Assistant Examiner* — Brandon Z Willis
(74) *Attorney, Agent, or Firm* — Oliff PLC

(57) ABSTRACT

A vehicle control system that acquires position information of a vehicle in a driving state of a manually driven state or a remotely operated driven state; that stores a pre-traveled travel route of a vehicle in the manually driven state or the remotely operated driven state based on the acquired position information; and that creates a travel route on which a vehicle is caused to travel in an autonomously driven state using the stored travel route.

14 Claims, 16 Drawing Sheets

(58) Field of Classification Search
CPC .... G05D 1/0016; G05D 1/0061; G01C 21/38; G01C 21/3856; G01C 21/3804
See application file for complete search history.

(56) References Cited

U.S. PATENT DOCUMENTS

| | | |
|---|---|---|
| 2017/0011270 A1 | 1/2017 | Kamada |
| 2019/0179305 A1* | 6/2019 | Magzimof ........... G05D 1/0038 |
| 2020/0057453 A1* | 2/2020 | Laws ....................... G08G 1/22 |
| 2020/0064144 A1* | 2/2020 | Tomita ................. G05D 1/0088 |
| 2021/0016792 A1* | 1/2021 | Kaneko ............... B60W 60/001 |

FOREIGN PATENT DOCUMENTS

| | | |
|---|---|---|
| JP | 2018-146474 A | 9/2018 |
| WO | 2015/129045 A1 | 9/2015 |

* cited by examiner

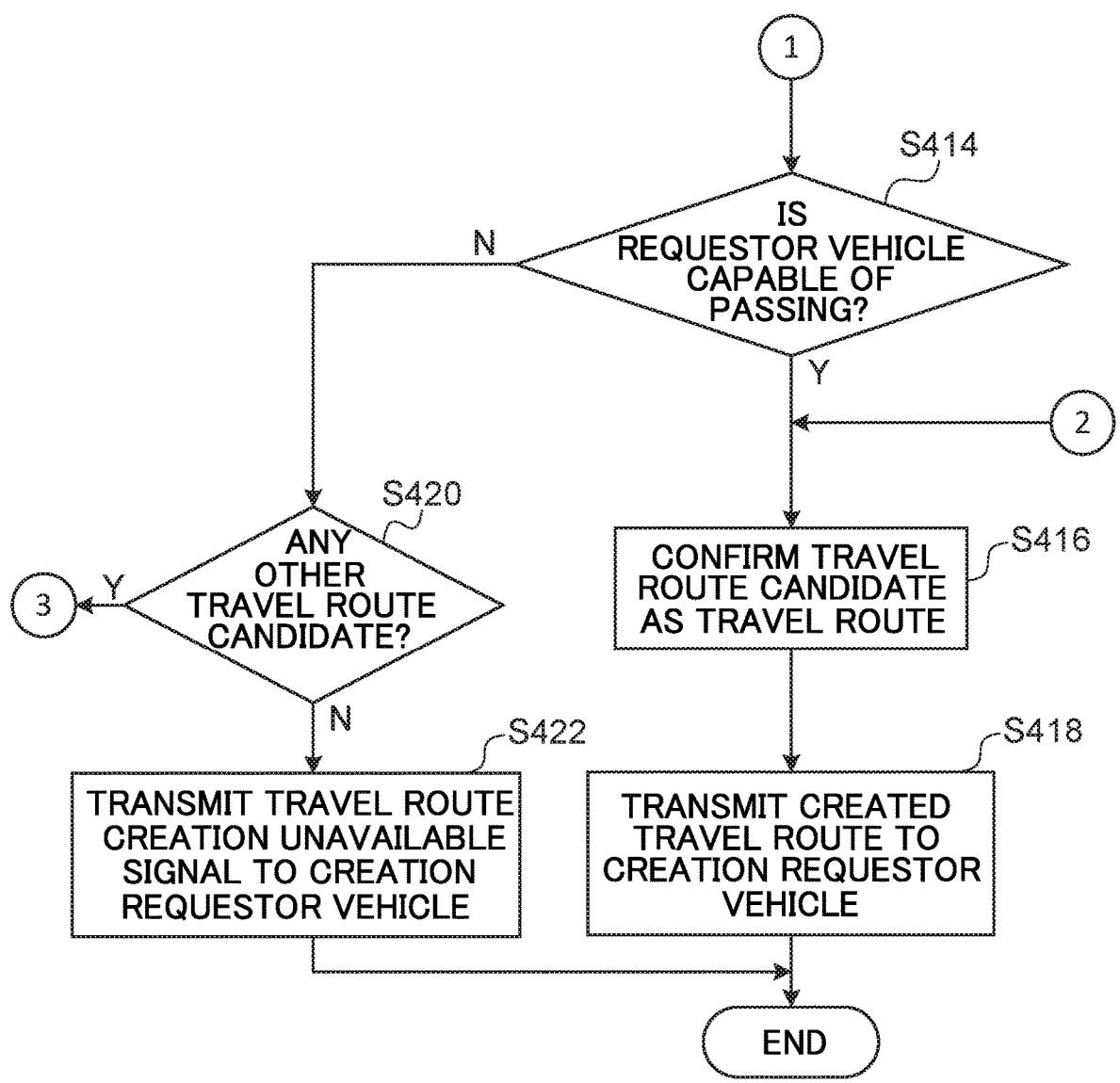

VEHICLE CONTROL SYSTEM, VEHICLE CONTROLLER DEVICE AND VEHICLE CONTROL METHOD

CROSS-REFERENCE TO RELATED APPLICATION

This application is based on and claims priority under 35 USC 119 from Japanese Patent Application No. 2019-135287 filed on Jul. 23, 2019, the disclosure of which is incorporated by reference herein.

BACKGROUND

Technical Field

The present disclosure relates to a vehicle control system, a vehicle controller device and a vehicle control method.

Related Art

Vehicles exist that are capable of switching driving states between a manually driven state, a remotely operated driven state, and an autonomously driven state (see, for example, U.S. Pat. No. 9,964,948). When in the autonomously driven state, such vehicles travel on a route based on map information and the like while checking the external environment of the vehicle using cameras and the like.

However, in abnormal circumstances such as in the aftermath of a large-scale natural disaster, vehicles are sometimes unable to travel in an autonomously driven state on an initial route that is based on map information due to obstacles scattered on the road, collapsed buildings, blocked roads, and so on.

In such cases, there is no option other than to reach a destination by a driver selecting roads by trial and error with the vehicle in the manually driven state or the vehicle in the remotely operated driven state.

SUMMARY

An aspect of the disclosure is a vehicle control system that includes: a position information acquisition section that acquires position information of a vehicle in a driving state of a manually driven state or a remotely operated driven state; a travel route storage section that stores a pre-traveled travel route of a vehicle in the manually driven state or the remotely operated driven state based on the position information acquired by the position information acquisition section; and a travel route creation section that creates a travel route on which a vehicle is caused to travel in an autonomously driven state using the travel route stored in the travel route storage section.

BRIEF DESCRIPTION OF DRAWINGS

FIG. 15 is a flowchart illustrating an example of travel route creation control according to the second exemplary embodiment.

DETAILED DESCRIPTION

First Exemplary Embodiment

Explanation follows regarding a vehicle control system according to a first exemplary embodiment, with reference to FIG. 1 to FIG. 9.

Configuration

Figure 1:
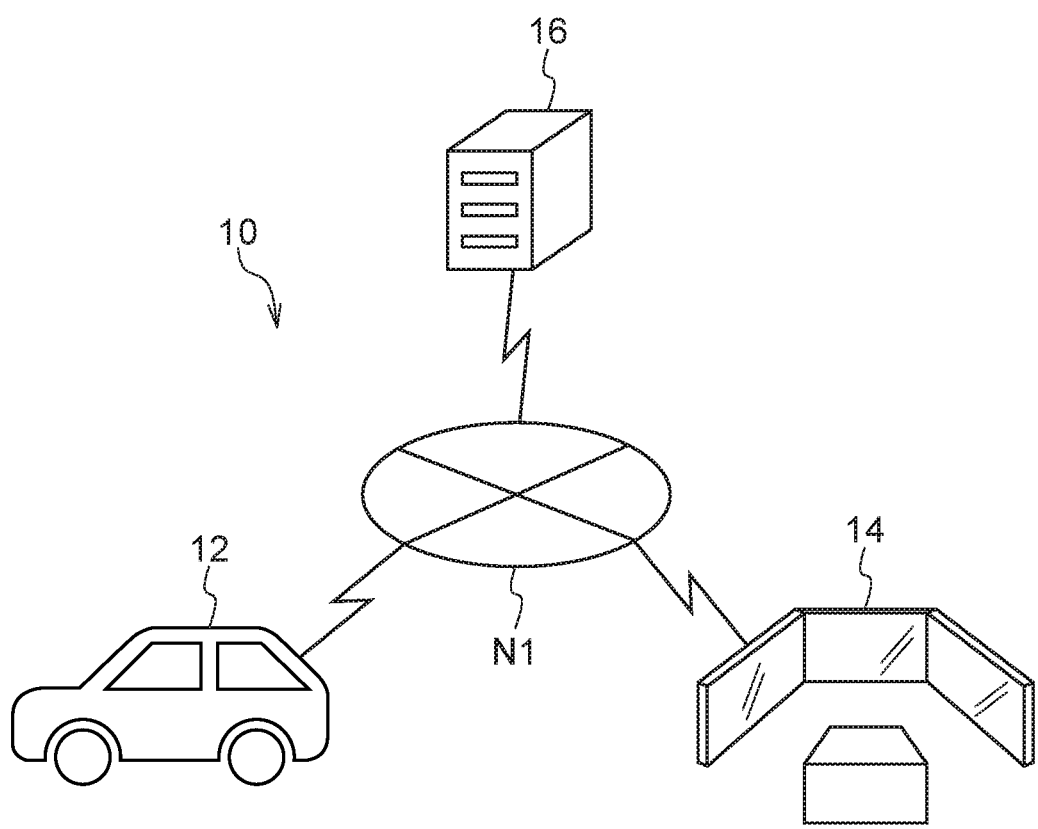
FIG. 1 is a schematic configuration diagram illustrating an example of an overall vehicle control system according to a first exemplary embodiment.

As illustrated in FIG. 1, a vehicle control system 10 according to the first exemplary embodiment is configured including a vehicle 12, a remote operation station 14, and an information server 16.

The vehicle 12, the remote operation station 14, and the information server 16 of the present exemplary embodiment are capable of communicating with each other through a network N1.

The vehicle 12 is configured so as to be capable of executing autonomous driving in which self-driving is performed based on a pre-generated travel plan, remote driving based on operation of the remote operation station 14 by a remote driver, and manual driving based on operation by an occupant of the vehicle 12 (namely, a driver).

Vehicle

Figure 2:
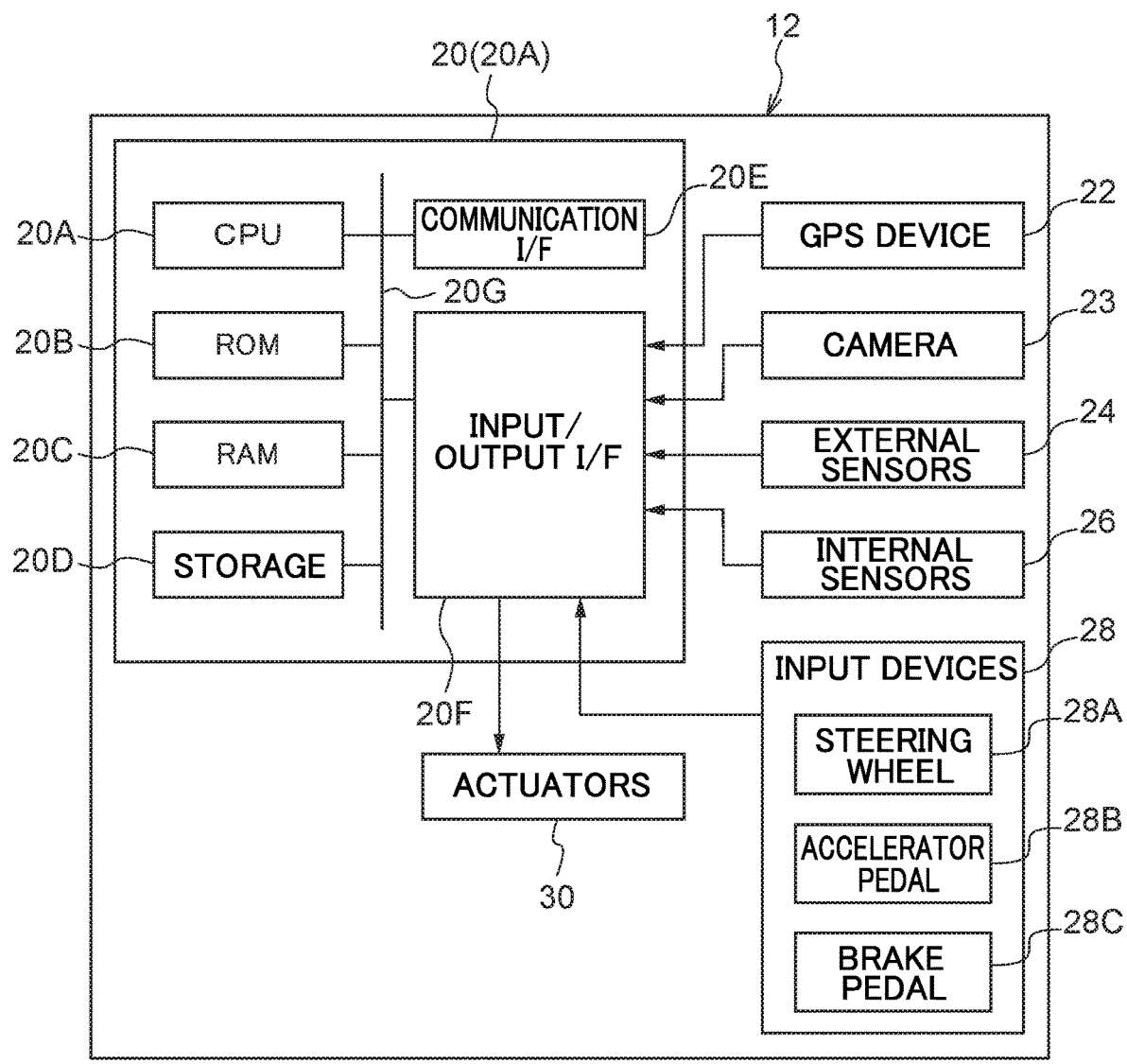
FIG. 2 is a block diagram illustrating an example of hardware configuration of a vehicle in a vehicle control system according to an exemplary embodiment.

FIG. 2 is a block diagram illustrating hardware configuration of equipment installed in the vehicle 12 of the present exemplary embodiment. The vehicle 12 includes a vehicle controller device 20, a global positioning system (GPS) device 22, a camera 23, external sensors 24 configured of external sensors other than the camera 23, internal sensors 26, input devices 28, and actuators 30.

The vehicle controller device 20 is configured including a central processing unit (CPU) 20A, read only memory (ROM) 20B, random access memory (RAM) 20C, storage 20D, a communication interface (I/F) 20E, and an input/output I/F 20F. The CPU 20A, the ROM 20B, the RAM 20C, the storage 20D, the communication I/F 20E and the input/output I/F 20F are connected together so as to be capable of communicating with each other through a bus 20G.

The CPU 20A is a central processing unit that executes various programs and controls various sections. Namely, the CPU 20A reads a program from the ROM 20B and executes the program, using the RAM 20C as a workspace. In the present exemplary embodiment, an execution program is stored in the ROM 20B.

The ROM 20B illustrated in FIG. 2 stores various programs and various data. The RAM 20C serves as a workspace to temporarily store the programs or data.

The storage 20D is configured by a hard disk drive (HDD) or a solid state drive (SSD), and stores various programs including an operating system, as well as various data.

The communication I/F 20E includes an interface for connecting to the network N1 in order to communicate with the remote operation station 14, the information server 16, and so on. A communication protocol such as Ethernet (registered trademark), FDDI, or Wi-Fi (registered trademark) is employed for this interface.

The communication I/F 20E of the present exemplary embodiment transmits a surroundings image captured by the camera 23 to the remote operation station 14 that is external to the vehicle 12, and receives remote operation information, this being operation information to operate the vehicle 12, from the remote operation station 14 through the network N1. The communication I/F 20E also receives disaster occurrence information, described later, from the information server 16 through the network N1. The disaster occurrence information includes disaster information regarding earthquakes, tsunamis, or the like, information regarding damage, and so on.

The input/output I/F 20F is an interface for communicating with the various devices installed in the vehicle 12. The vehicle controller device 20 of the present exemplary embodiment is connected to the GPS device 22, the camera 23, the external sensors 24, the internal sensors 26, the input devices 28, and the actuators 30 through the input/output I/F 20F. Note that the GPS device 22, the camera 23, the external sensors 24, the internal sensors 26, the input devices 28, and the actuators 30 may be directly connected to the bus 20G.

The GPS device 22 is a device for measuring the current position of the vehicle 12. The GPS device 22 includes an antenna to receive signals from GPS satellites.

The camera 23 captures images of the vehicle 12 surroundings (hereafter referred to as surroundings images), including ahead of the vehicle 12.

The external sensors 24 are a group of sensors excluding the camera 23 that detect peripheral information regarding the surroundings of the vehicle 12. The external sensors 24 include millimeter-wave radar that transmits scanning waves over a predetermined range, and laser imaging detection and ranging (LIDAR) that scans a predetermined range.

The internal sensors 26 are a group of sensors that detect travel states of the vehicle 12. The internal sensors 26 include at least one out of a vehicle speed sensor, an acceleration sensor, and a yaw rate sensor.

The input devices 28 are a group of switches to be operated by the occupant on board the vehicle 12. The input devices 28 include a steering wheel 28A serving as a switch to steer the steered wheels of the vehicle 12, an accelerator pedal 28B serving as a switch to cause the vehicle 12 to accelerate, and a brake pedal 28C serving as a switch to cause the vehicle 12 to decelerate.

The actuators 30 include a steering wheel actuator to drive the steered wheels of the vehicle 12, an accelerator actuator to control acceleration of the vehicle 12, and a brake actuator to control deceleration of the vehicle 12.

Figure 3:
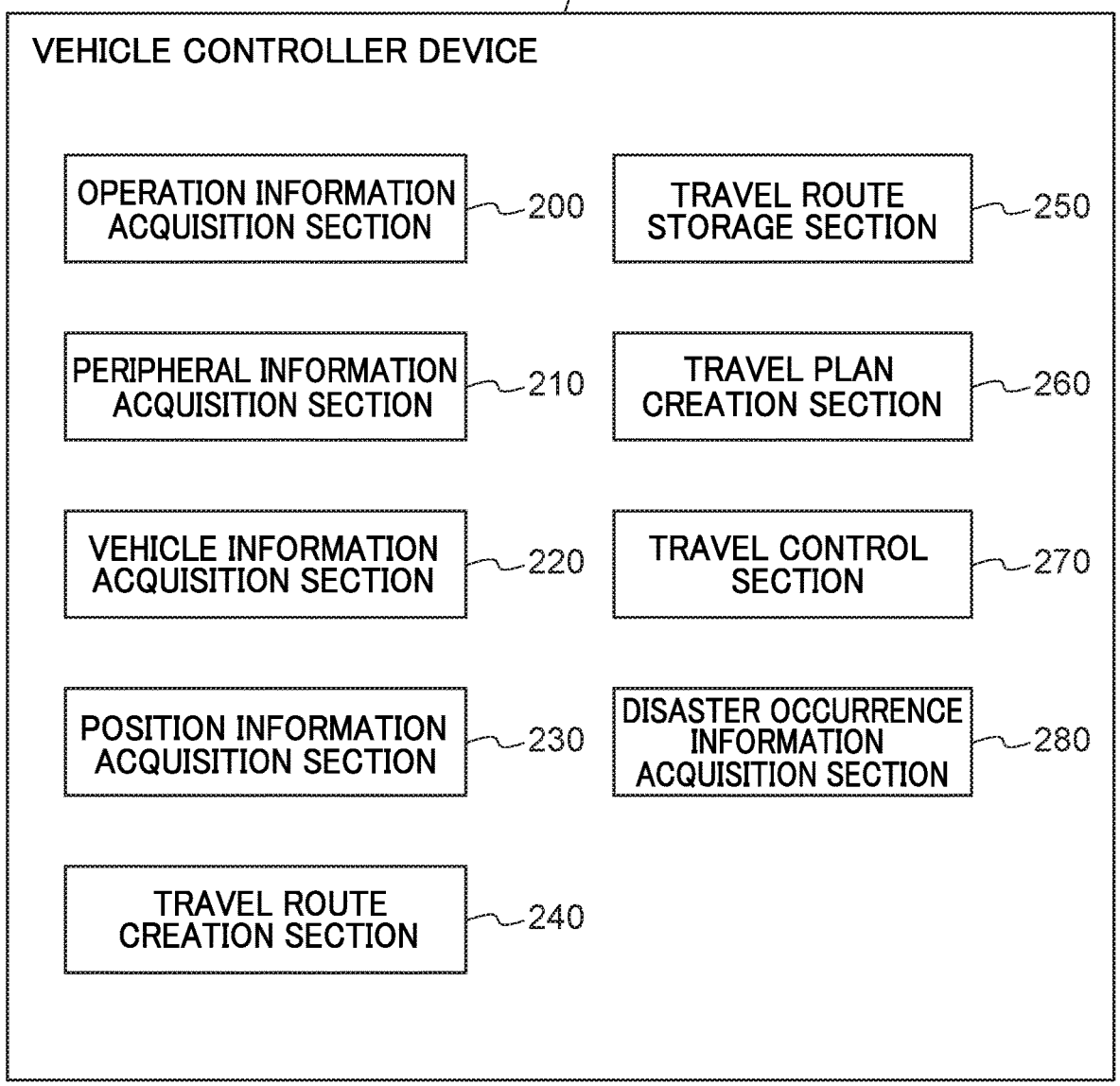
FIG. 3 is a block diagram illustrating an example of functional configuration of a vehicle controller device according to the first exemplary embodiment.

FIG. 3 is a block diagram illustrating an example of functional configuration of the vehicle controller device 20. As illustrated in FIG. 3, the vehicle controller device 20 includes an operation information acquisition section 200, a peripheral information acquisition section 210, a vehicle information acquisition section 220, a position information acquisition section 230, a travel route creation section 240, a travel route storage section 250, a travel plan creation section 260, a travel control section 270, and a disaster occurrence information acquisition section 280. Each of the functional configurations is implemented by the CPU 20A reading the execution program stored in the ROM 20B and executing this program.

During manual driving of the vehicle 12, the operation information acquisition section 200 acquires operation amounts of the steering wheel 28A, the accelerator pedal 28B, and the brake pedal 28C by the occupant (driver) from the input devices 28 through the input/output I/F 20F.

The peripheral information acquisition section 210 includes functionality to acquire peripheral information regarding the periphery of the vehicle 12. The peripheral information acquisition section 210 acquires the surroundings images of the vehicle 12 captured by the camera 23 and peripheral information from the external sensors 24 regarding the vehicle 12 through the input/output I/F 20F. The "peripheral information" includes not only information regarding vehicles and pedestrians in the surroundings of the vehicle 12, but also regarding the weather, brightness, road width, obstacles, and so on.

The vehicle information acquisition section 220 includes functionality to acquire vehicle information such as the vehicle speed, acceleration, yaw rate, and so on of the vehicle 12. The vehicle information acquisition section 220 acquires the vehicle information regarding the vehicle 12 from the internal sensors 26 through the input/output I/F 20F.

The position information acquisition section 230 includes functionality to acquire the current position of the vehicle 12. The position information acquisition section 230 acquires position information from the GPS device 22 through the input/output I/F 20F.

Following the acquisition of disaster occurrence information, described later, the travel route creation section 240 creates a travel route based on previous travel of the vehicle 12 by manual driving or remotely operated driving.

The travel route storage section 250 stores the travel route created by the travel route creation section 240.

The travel plan creation section 260 includes functionality to generate a travel plan to cause the vehicle 12 to travel based on the position information acquired by the position information acquisition section 230, the peripheral information acquired by the peripheral information acquisition section 210, and the vehicle information acquired by the vehicle information acquisition section 220. The travel plan includes not only a travel route to a pre-set destination, but also information regarding a course to avoid obstacles ahead of the vehicle 12, the speed of the vehicle 12, and so on.

The travel control section 270 includes functionality to control autonomous driving based on the travel plan generated by the travel plan creation section 260, remote driving based on the remote operation information received from the remote operation station 14, and manual driving based on the vehicle operation information received by the operation information acquisition section 200.

The disaster occurrence information acquisition section 280 detects the occurrence of a disaster based on a disaster occurrence signal, described later, received from the information server 16. Note that the disaster occurrence information acquisition section 280 may be configured so as to acquire disaster information for the area of travel from a television or radio broadcast. The disaster occurrence information acquisition section 280 corresponds to an "information acquisition section".

Examples of disasters referred to herein include natural disasters such as flooding, heavy snow, tornadoes, earthquakes, tsunamis, landslides, and volcanic eruptions, as well as man-made disasters such as traffic accidents and fires.

Remote Operation Station

Figure 4:
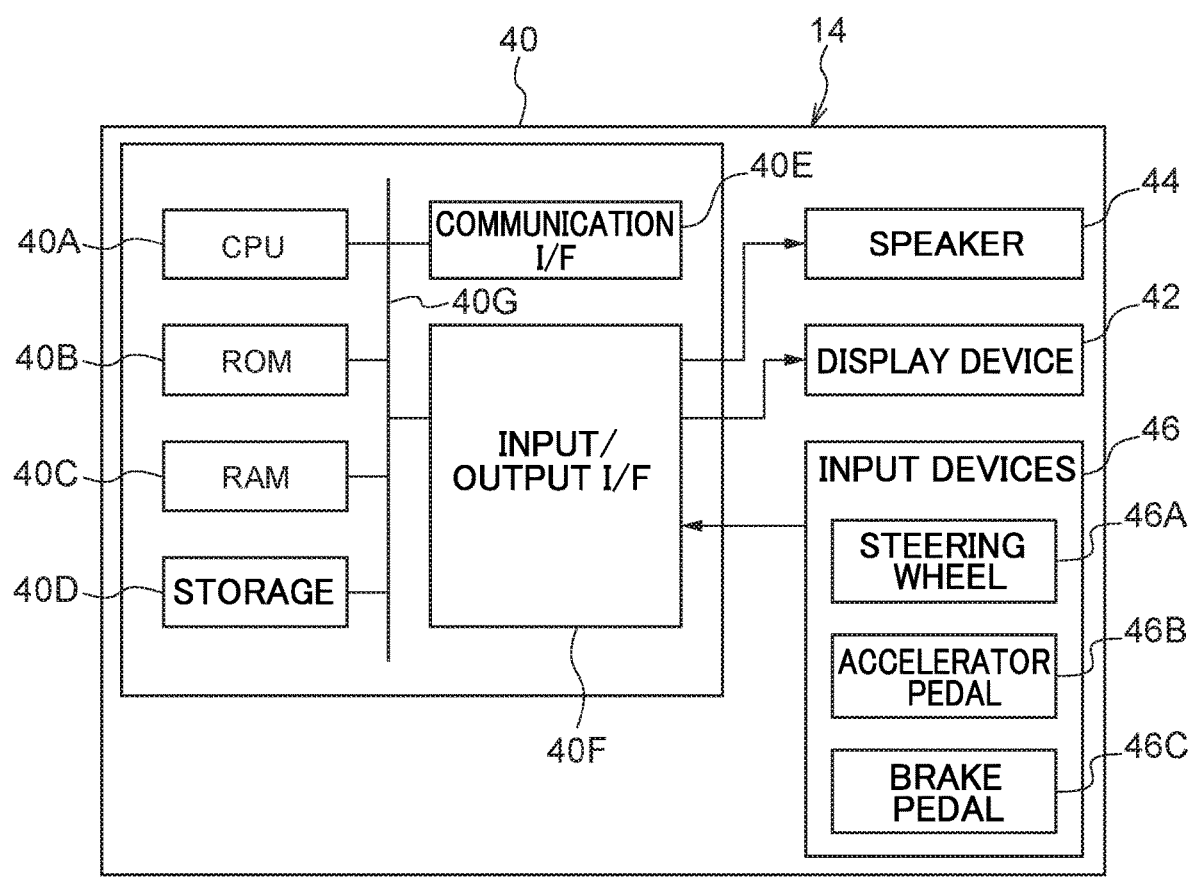
FIG. 4 is a block diagram illustrating an example of hardware configuration of a remote operation station in a vehicle control system according to an exemplary embodiment.

FIG. 4 is a block diagram illustrating hardware configuration of equipment installed in the remote operation station 14 of the present exemplary embodiment. The remote operation station 14 includes a remote controller device 40, as well as a display device 42, a speaker 44, and input devices 46.

The remote controller device 40 is configured including a CPU 40A, ROM 40B, RAM 40C, storage 40D, a communication I/F 40E and an input/output I/F 40F. The CPU 40A, the ROM 40B, the RAM 40C, the storage 40D, the communication I/F 40E, and the input/output I/F 40F are connected together so as to be capable of communicating with each other through a bus 40G Functionality of the CPU 40A, the ROM 40B, the RAM 40C, the storage 40D, the communication I/F 40E, and the input/output I/F 40F matches that of the CPU 20A, the ROM 20B, the RAM 20C, the storage 20D, the communication I/F 20E, and the input/output I/F 20F of the vehicle controller device 20 previously described.

Figure 5:
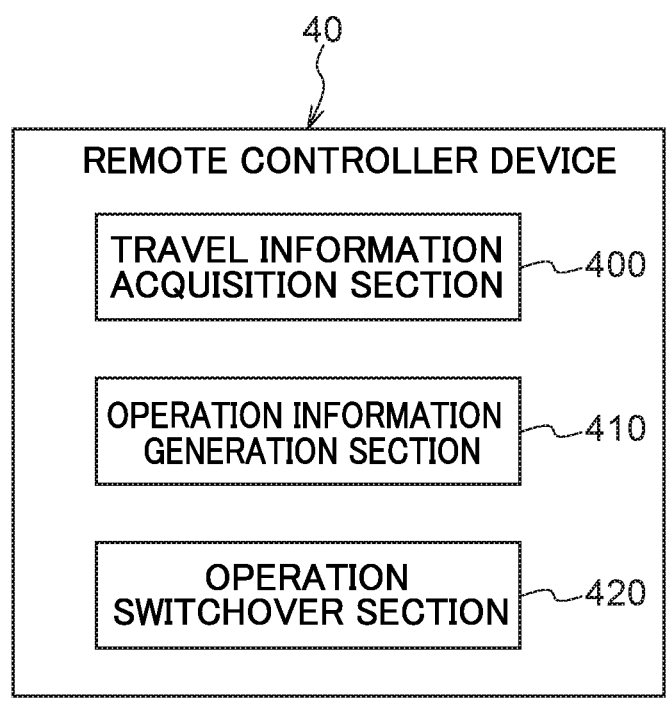
FIG. 5 is a block diagram illustrating an example of functional configuration of a remote controller device according to the first exemplary embodiment.

The CPU 40A reads a program from the ROM 40B and executes the program, using the RAM 40C as a workspace. In the present exemplary embodiment, a processing program is stored in the ROM 40B. When the CPU 40A executes the processing program, the remote controller device 40 functions as a travel information acquisition section 400, an operation information generation section 410, and an operation switchover section 420 as illustrated in FIG. 5.

In the remote controller device 40 of the present exemplary embodiment, the display device 42, the speaker 44, and the input devices 46 are connected to the input/output I/F 40F. Note that the display device 42, the speaker 44, and the input devices 46 may be directly connected to the bus 40G.

The display device 42 is a liquid crystal monitor for displaying a surroundings image captured by the camera 23 of the vehicle 12 and various information relating to the vehicle 12.

The speaker 44 is a speaker for replaying audio recorded by a microphone attached to the camera 23 of the vehicle 12 together with the surroundings image.

The input devices 46 are controllers operated by the remote driver using the remote operation station 14. The input devices 46 include a steering wheel 46A serving as a switch to steer the steered wheels of the vehicle 12, an accelerator pedal 46B serving as a switch to cause the vehicle 12 to accelerate, and a brake pedal 46C serving as a switch to cause the vehicle 12 to decelerate. Note that the implementation of the respective input devices 46 is not limited thereto. For example, a lever switch may be provided instead of the steering wheel 46A. As another example, push button switches or lever switches may be provided instead of the pedal switches of the accelerator pedal 46B or the brake pedal 46C.

FIG. 5 is a block diagram illustrating an example of functional configuration of the remote controller device 40. As illustrated in FIG. 5, the above-described remote controller device 40 includes the travel information acquisition section 400, the operation information generation section 410, and the operation switchover section 420.

The travel information acquisition section 400 includes functionality to acquire audio as well as the surroundings images from the camera 23 transmitted by the vehicle controller device 20, and vehicle information such as the vehicle speed. The acquired surroundings image and vehicle information are displayed on the display device 42 and the audio information is output through the speaker 44.

The operation information generation section 410 includes functionality to receive signals output from the various input devices 46 when remote driving is being performed based on operation by the remote driver. The operation information generation section 410 also generates remote operation information to be transmitted to the vehicle controller device 20 based on the signals received from the various input devices 46.

The operation switchover section 420 includes functionality to switch the vehicle controller device 20 over to remote driving. When the remote driver operates an operation section of the remote operation station 14 to perform remote driving, a switchover signal or a switchover preparation signal is output to the vehicle controller device 20. For example, when information relating to operation authority has already been received from the vehicle controller device 20 of the vehicle 12, the operation switchover section 420 outputs a switchover signal to the vehicle controller device 20 so as to switch the vehicle 12 over from manual driving or autonomous driving to remote driving. Alternatively, for example, when the operation switchover section 420 has transmitted a switchover preparation signal to the vehicle controller device 20 in advance, switchover of the vehicle 12 from manual driving or autonomous driving to remote driving is performed at a stage when operation authority is conferred by the vehicle controller device 20.

Information Server

Figure 6:
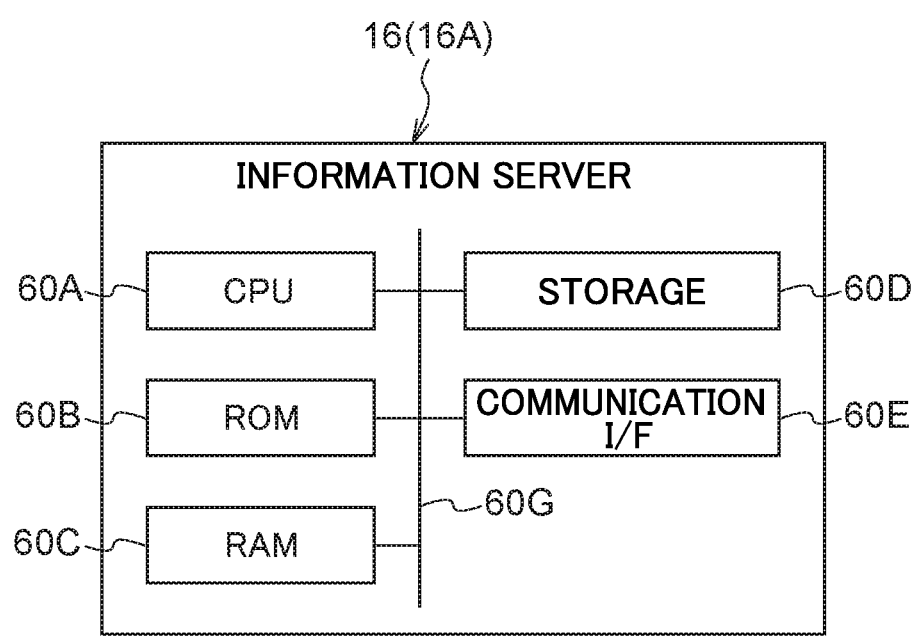
FIG. 6 is a block diagram illustrating an example of hardware configuration of an information server in a vehicle control system according to an exemplary embodiment.

As illustrated in FIG. 6, the information server 16 is configured including a CPU 60A, ROM 60B, RAM 60C, storage 60D, and a communication I/F 60E. The CPU 60A, the ROM 60B, the RAM 60C, the storage 60D, and the communication I/F 60E are connected together so as to be capable of communicating with each other through a bus 60G. Functionality of the CPU 60A, the ROM 60B, the RAM 60C, the storage 60D, and the communication I/F 60E matches that of the CPU 20A, the ROM 20B, the RAM 20C, the storage 20D, and the communication I/F 20E of the vehicle controller device 20 previously described.

The CPU 60A reads a program from the ROM 60B or the storage 60D and executes the program, using the RAM 60C as a workspace. In the present exemplary embodiment, an information processing program is stored in the storage 60D. By executing the information processing program, the CPU 60A functions as an external information acquisition section 600 and a disaster occurrence information creation section 610 illustrated in FIG. 7.

Figure 7:
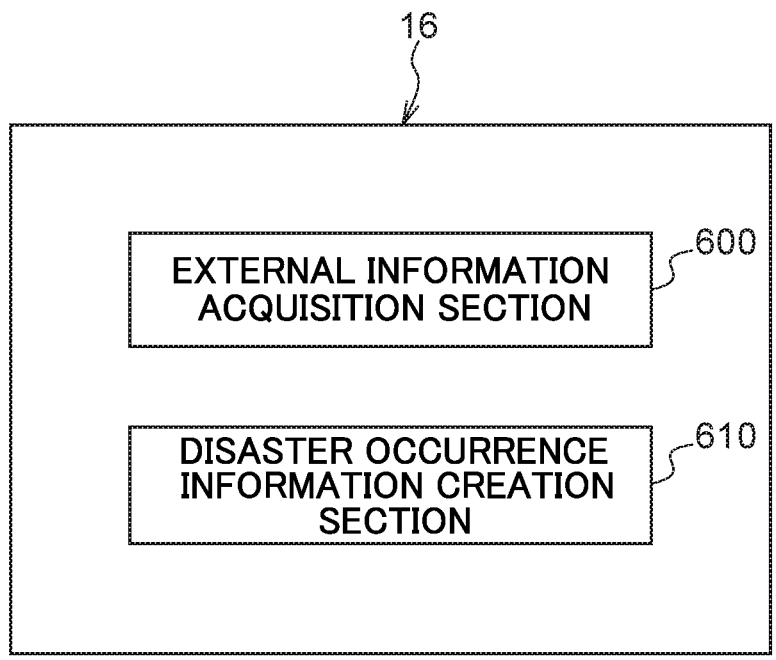
FIG. 7 is a block diagram illustrating an example of functional configuration of an information server according to the first exemplary embodiment.

FIG. 7 is a block diagram illustrating an example of functional configuration of the information server 16. As illustrated in FIG. 7, the information server 16 includes the external information acquisition section 600 and the disaster occurrence information creation section 610.

The external information acquisition section 600 includes functionality to acquire various information from outside the information server 16. The acquired information includes news information in addition to weather information, earthquake information, traffic information, and so on.

The disaster occurrence information creation section 610 includes functionality to create disaster occurrence information to transmit to the vehicle controller device 20 based on the information acquired by the external information acquisition section 600. For example, of the information acquired by the external information acquisition section 600, the disaster occurrence information creation section 610 generates disaster occurrence information covering the area around where the vehicle 12 is currently traveling as the disaster occurrence information for the vehicle 12.

Operation

Explanation follows regarding operation of the vehicle control system 10 according to the present exemplary embodiment.

First, a brief explanation follows regarding cases in which manual driving, autonomous driving, and remotely operated driving of the vehicle 12 are performed in the vehicle control system 10. Explanation is then given regarding autonomous driving performed by the vehicle 12 on a return journey, with reference to a case in which the vehicle 12 drives from a departure point to a destination and then back to the departure point, and in which an outward journey travel route is created on the manually driven outward journey, and a return journey travel route is created based on the travel route taken on the outward journey.

First, a brief explanation follows regarding cases in which manual driving, autonomous driving, and remotely operated driving of the vehicle 12 are performed.

The occupant of the vehicle 12 operates an input device such as a touch panel to change driving control states between a manually driven state, an autonomously driven state, and a remotely operated driven state.

In cases in which manual driving has been selected for the vehicle 12, operation amounts such as a depression amount of the accelerator pedal, a depression amount of the brake pedal, and a rotation amount of the steering wheel by the occupant (driver) are acquired by the operation information acquisition section 200 of the vehicle controller device 20, and these operation amounts are output to the travel control section 270. The travel control section 270 of the vehicle controller device 20 transmits control signals to the actuators 30 based on these operation amounts, such that travel of the vehicle 12 is manually driven.

In cases in which autonomous driving has been selected for the vehicle 12, the travel plan creation section 260 creates a travel plan based on the travel route information stored in the travel route storage section 250, the surroundings information from the camera 23, the external sensors 24, and so on, and the position information acquired by the position information acquisition section 230. The vehicle 12 travels to its destination by being autonomously driven based on the created travel plan.

In cases in which remotely operated driving has been selected for the vehicle 12, the remote driver at the remote operation station 14 operates the input devices 46 while viewing the surroundings images captured by the camera 23 of the vehicle 12 and the like. An operation information signal according to the operation amounts is generated by the operation information generation section 410 of the remote operation station 14, and this signal is transmitted to the vehicle 12. The travel control section 270 of the vehicle controller device 20 transmits control signals to the actuators 30 based on this information, such that travel of the vehicle 12 is driven by remote operation.

Next, explanation follows regarding a case in which the vehicle 12 is manually driven on an outward journey to a destination in a state in which the road conditions are unknown, such as when dispatched to assist in a disaster area, and the vehicle 12 is autonomously driven on a return journey back from the destination to its departure point.

In cases in which the external information acquisition section 600 of the information server 16 has detected from weather information, news, or the like that a disaster has occurred, for example a large-scale natural disaster such as an earthquake, a typhoon, or a volcanic eruption, or a man-made disaster such as a major fire, the disaster occurrence information creation section 610 creates disaster occurrence information and transmits the disaster occurrence information to the vehicle 12 traveling close to the disaster occurrence area.

Figure 8:
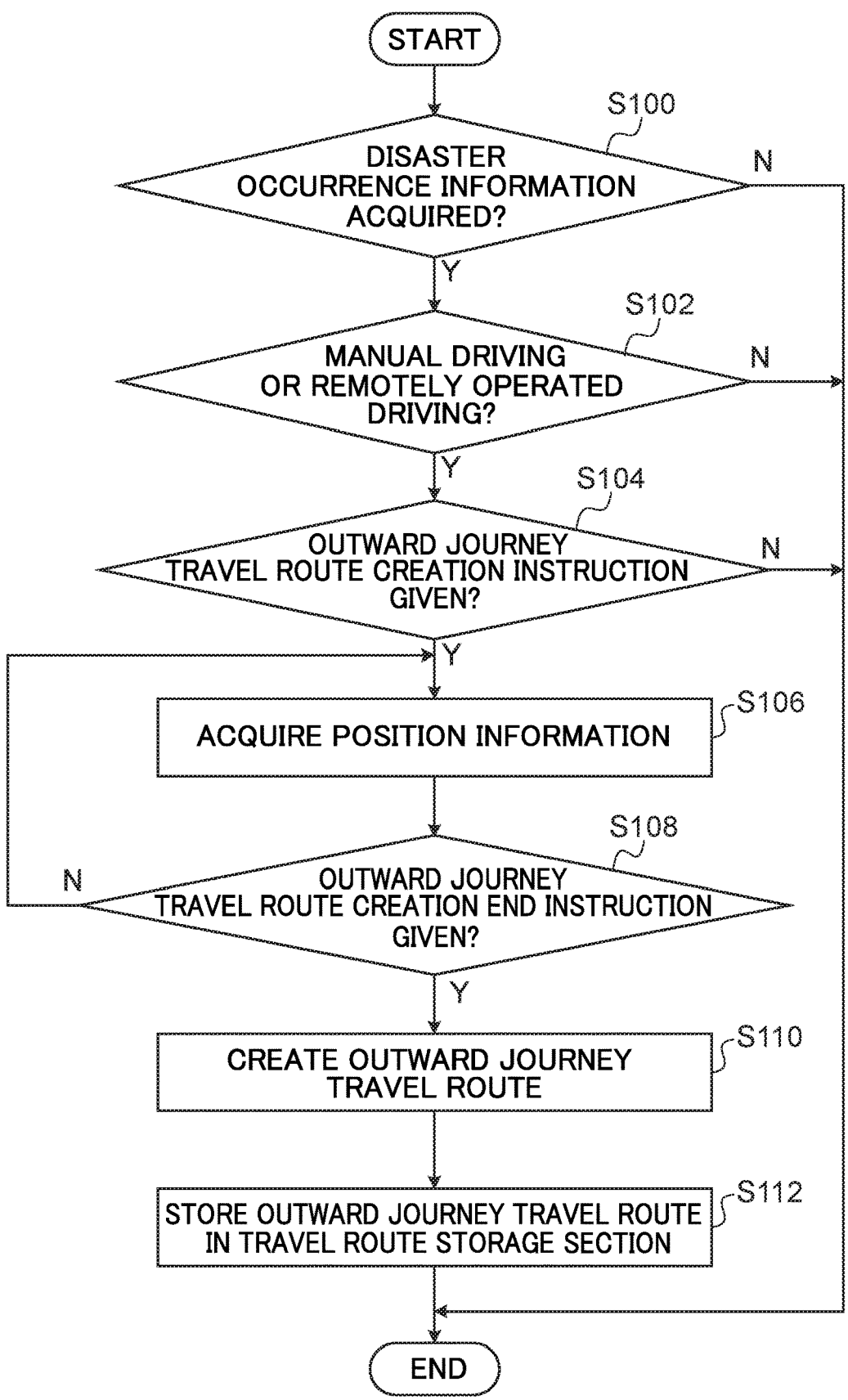
FIG. 8 is a flowchart illustrating an example of outward journey travel route creation control according to the first exemplary embodiment.

As illustrated in FIG. 8, the CPU 20A of the vehicle 12 determines whether or not disaster occurrence information has been received (step S100 in FIG. 8 (reference to FIG. 8 will be omitted hereafter)).

In cases in which disaster occurrence information has not been acquired, the CPU 20A ends the processing (NO at step S100). In cases in which disaster occurrence information has been acquired (YES at step S100), the CPU 20A determines whether or not the vehicle is in the manually driven state or the remotely operated driven state (step S102).

In cases in which the vehicle 12 is in the autonomously driven state (NO at step S102), the CPU 20A ends the processing.

In cases in which the vehicle 12 is in the manually driven state or the remotely operated driven state (YES at step S102), the CPU 20A determines whether or not an instruction signal for outward journey travel route creation has been input by the occupant of the vehicle 12 operating the touch panel or the like at the departure point (step S104).

In cases in which no outward journey travel route creation instruction has been given and the vehicle 12 is in the manually driven state or the remotely operated driven state (NO at step S104), the CPU 20A ends the processing.

In cases in which the occupant of the vehicle 12 has given an outward journey travel route creation instruction by operating the touch panel or the like (YES at step S104), the CPU 20A acquires position information for the vehicle 12 acquired by the position information acquisition section 230 at predetermined time intervals (step S106).

When the occupant has given an outward journey travel route creation end instruction by operating the touch panel or the like (step S108), the CPU 20A creates a travel route (outward journey travel route) (step S110) based on the position information acquired at the predetermined time intervals between the outward journey travel route creation instruction being input to the travel route creation section 240 and the outward journey travel route creation end instruction being input. The outward journey travel route is stored in the travel route storage section 250 (step S112).

Next, explanation follows regarding a case in which the vehicle 12 is autonomously driven from its destination back to its departure point after the vehicle 12 has been manually driven so as to travel from its departure point to its destination as described above.

Figure 9:
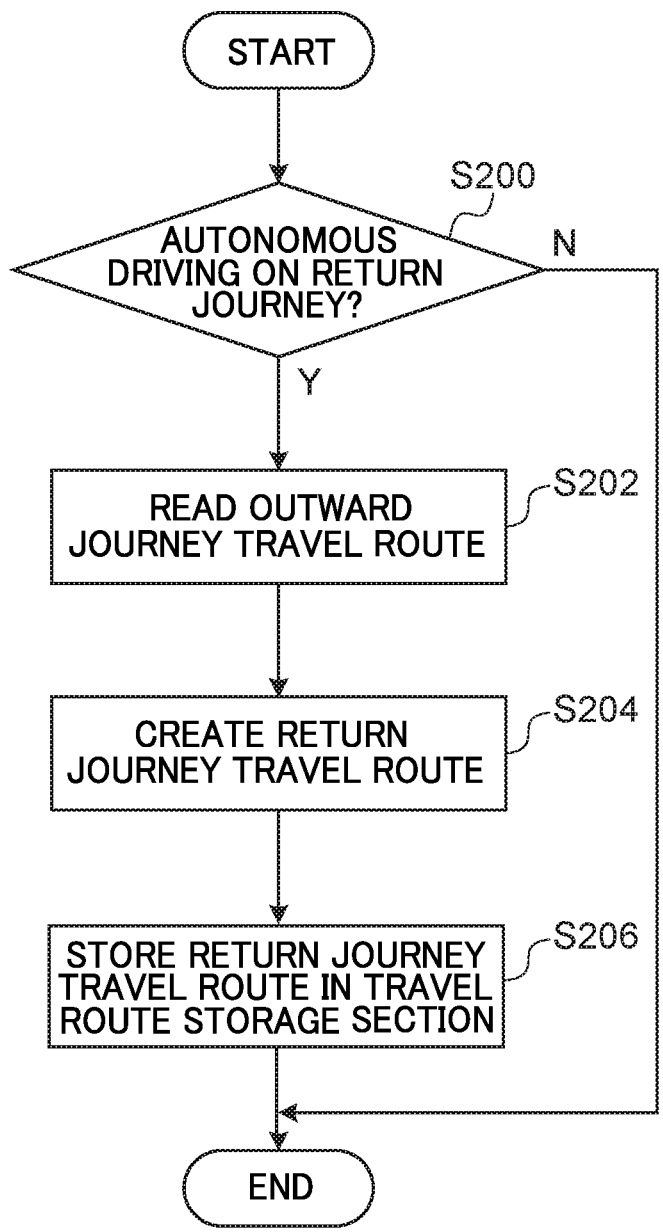
FIG. 9 is a flowchart illustrating an example of return journey travel route creation control according to the first exemplary embodiment.

The occupant of the vehicle 12 is able to select return journey autonomous driving by operating the touch panel or the like. As illustrated in FIG. 9, the CPU 20A of the vehicle 12 judges whether or not return journey autonomous driving has been selected (step S200). In cases in which return journey autonomous driving has not been selected (NO at step S200), the CPU 20A ends the processing.

When a return journey autonomous driving signal has been input as a result of operation by the occupant (YES at step S200), the CPU 20A reads the outward journey travel route stored in the travel route storage section 250 (step S202).

The CPU 20A reverses the departure point and the destination of the outward journey travel route using the travel route creation section 240 to create a return journey travel route, and stores this in the travel route storage section 250 (steps S204 and S206).

In this manner in the CPU 20A, the travel plan creation section 260 creates a travel plan based on the return journey travel route, the peripheral information, and so on, and the travel control section 270 controls the actuators 30 based on this travel plan, such that the vehicle 12 is autonomously driven from its departure point (i.e. the destination of the outward journey) to its destination (i.e. the departure point of the outward journey).

In cases in which the outward journey is made by remotely operated driving and not manual driving, the remote driver operates the remote operation station 14 in a similar manner to that during manual driving, such that an outward journey travel route is created by the CPU 20A and a return journey travel route is created based on the outward journey travel route.

In this manner, in the vehicle control system 10 of the present exemplary embodiment, in cases such as in the aftermath of a disaster when road conditions are unknown and thus the ability of the vehicle 12 to travel to its destination by autonomous driving is unknown, travel of the vehicle 12 from its departure point to its destination is performed by manual driving or remotely operated driving. The ability to pass along roads is therefore visually checked such that passable roads can be selected and the vehicle 12 can reliably reach its destination.

Moreover, in cases in which the vehicle 12 is autonomously driven on the return journey, the vehicle control system 10 creates the return journey travel route by reversing the departure point and the destination of the (pre-traveled) outward journey travel route that has already been traveled by manual driving or remotely operated driving. The vehicle 12 is then autonomously driven from its departure point (i.e. the destination of the outward journey) to its destination (i.e. the departure point of the outward journey) based on this return journey travel route.

This enables travelable roads to be selected and the vehicle 12 to be autonomously driven to the destination of its return journey reliably in cases in which road conditions are unknown, such as in the aftermath of a disaster.

For example, in a large-scale natural disaster, a vehicle 12 loaded with a rescue party or relief supplies can be manually driven to a disaster area, and can then be returned to its departure point by being autonomously driven on the return journey. This enables the driver of the vehicle 12 to remain on site to assist with the relief operation.

Likewise, in cases of remotely operated driving autonomously driving the vehicle 12 on the return journey enables the remote driver to take on other tasks, such as remotely operated driving of another vehicle.

Furthermore, in cases in which the vehicle 12 makes plural round trips, as long as the vehicle 12 is driven by remote operation or manually driven for the initial outward journey, the vehicle 12 can then be autonomously driven on the initial return journey and on all subsequent round trips, enabling the manpower required to drive the vehicle to be reduced and thereby assigned to other activities.

Furthermore, in the present exemplary embodiment the outward journey travel route is only stored following the acquisition of disaster occurrence information, and so only a travel route traveled in the aftermath of the disaster is stored. A travel route that is passable in the aftermath of the disaster is thus reliably created, further increasing the possibility of travel by autonomous driving.

Second Exemplary Embodiment

Explanation follows regarding a vehicle control system 700 according to a second exemplary embodiment of the present invention, with reference to FIG. 10 to FIG. 16. Configuration elements that are similar to those in the first exemplary embodiment are allocated the same reference numerals and detailed explanation thereof is omitted.

Figure 10:
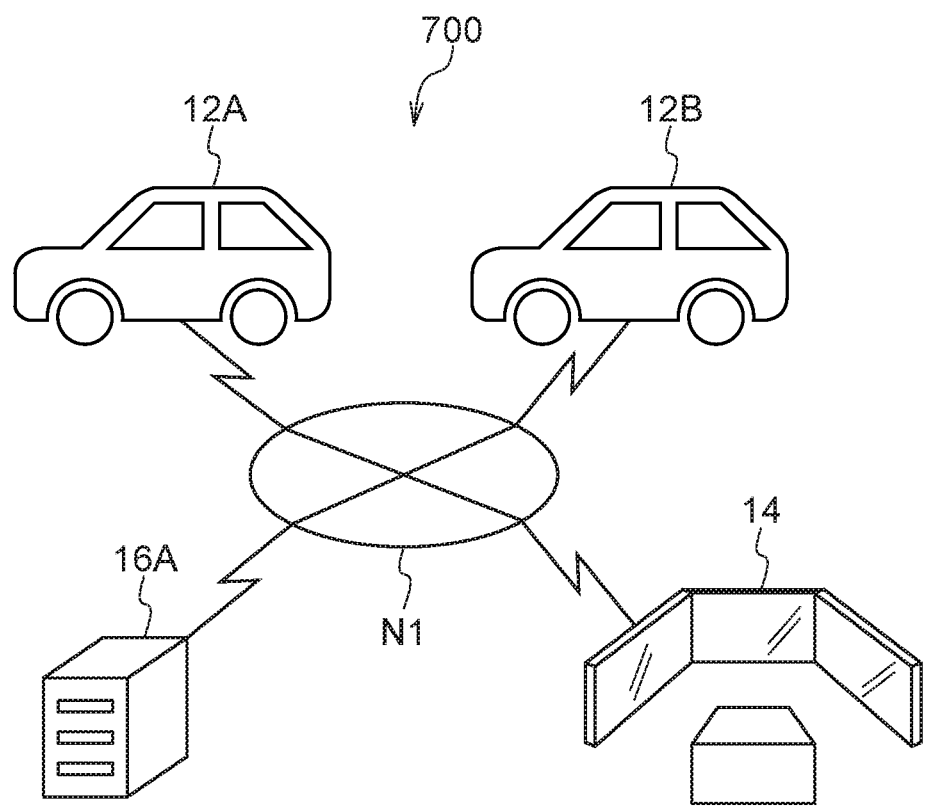
FIG. 10 is a schematic configuration diagram illustrating an example of an overall vehicle control system according to a second exemplary embodiment.

As illustrated in FIG. 10, in the vehicle control system 700, plural vehicles 12A, 12B, the remote operation station 14, and an information server 16A are connected together through the network N1. The two vehicles 12A, 12B are connected in the present exemplary embodiment. Although one of each of the remote operation station 14 and the information server 16 are provided in the present exemplary embodiment, plural of each may be provided.

Figure 11:
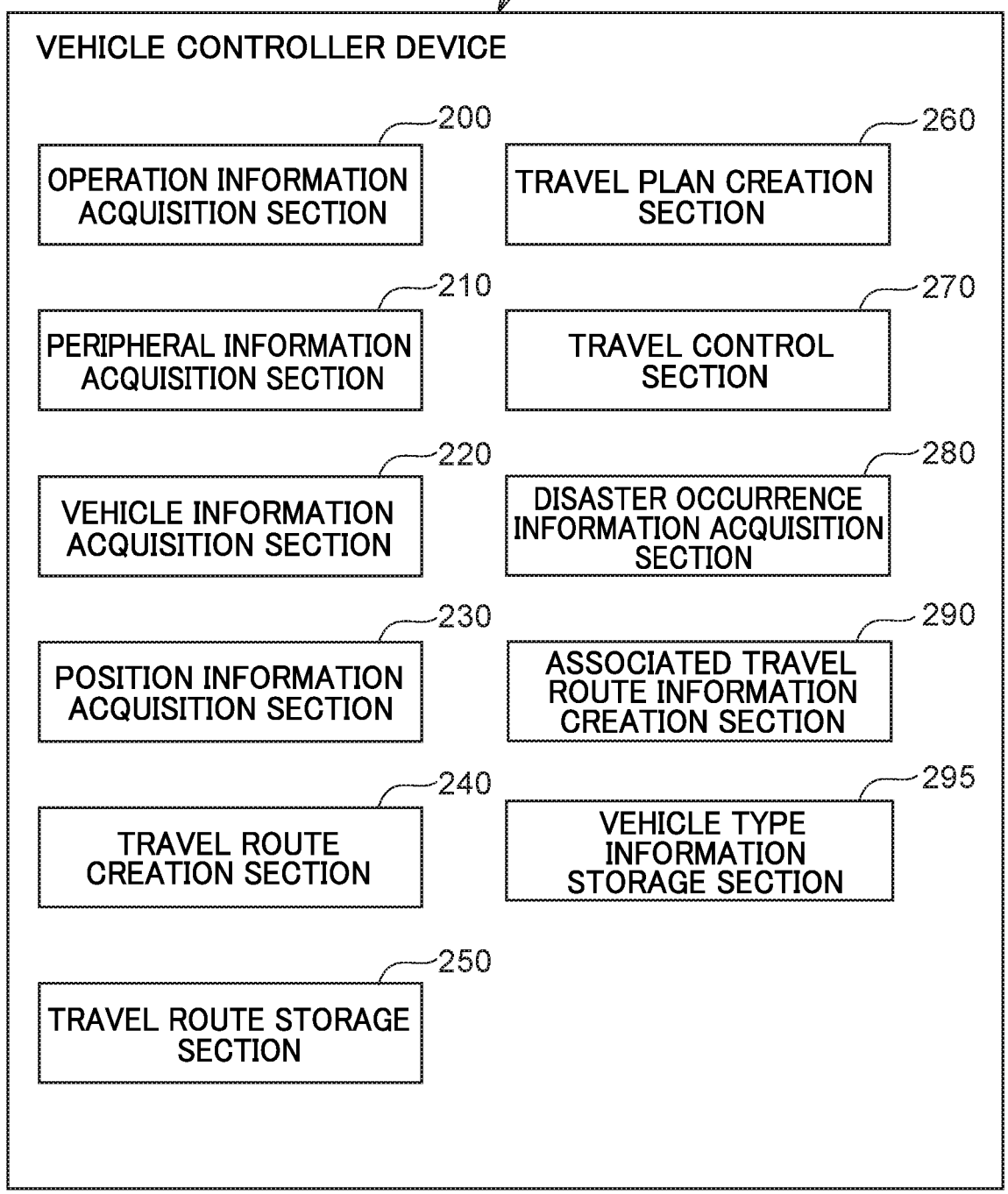
FIG. 11 is a block diagram illustrating an example of functional configuration of a vehicle controller device according to the second exemplary embodiment.

As illustrated in FIG. 11, although the vehicle 12A is substantially the same as the vehicle 12 of the first exemplary embodiment, in contrast to the vehicle controller device 20 of the first exemplary embodiment, a vehicle controller device 20A further includes an associated travel route information creation section 290 and a vehicle type information storage section 295.

The associated travel route information creation section 290 creates associated travel route information in which a created travel route, surroundings image information configured by surroundings images captured by the camera 23 while traveling on the travel route associated with capture position information, and vehicle type information regarding the vehicle 12A (a given vehicle) associated with the travel route are compiled together, and transmits this to the information server 16A through the communication I/F 20E.

The vehicle type information storage section 295 stores vehicle type information for the vehicle 12A (the given vehicle).

The vehicle 12B is similar to the vehicle 12A, and so explanation thereof is omitted.

Figure 12:
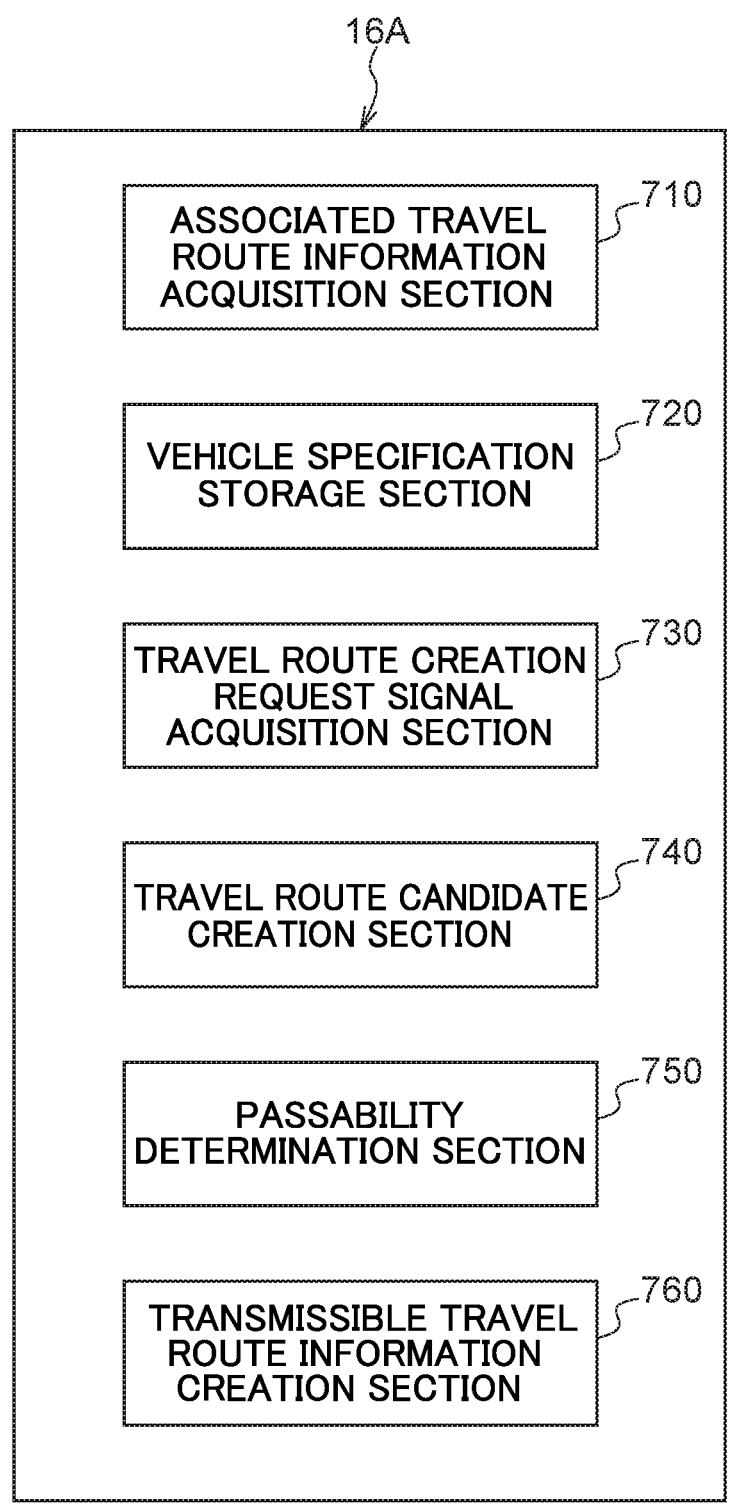
FIG. 12 is a block diagram illustrating an example of functional configuration of an information server according to the second exemplary embodiment.

FIG. 12 illustrates functional blocks of the information server 16A.

As illustrated in FIG. 12, the information server 16A is configured including an associated travel route information acquisition section 710, a vehicle specification storage section 720, a travel route creation request signal acquisition section 730, a travel route candidate creation section 740, a passability determination section 750, and a transmissible travel route information creation section 760.

The associated travel route information acquisition section 710 acquires the vehicle type information for the vehicles 12A, 12B associated with the travel routes and travel route information transmitted from the vehicles 12A, 12B, and also acquires the surroundings image information associated with position information on the travel routes, and stores this in the storage 60D. Note that the associated travel route information acquisition section 710 corresponds to a "travel route storage section" and also corresponds to a "surroundings image storage section".

The vehicle specification storage section 720 stores correspondence relationships between vehicle types and vehicle specifications (vehicle width, length, height, and so on).

The travel route creation request signal acquisition section 730 acquires travel route creation request signals specifying departure points and destinations and transmitted from the vehicles 12A, 12B through the communication I/F 60E.

The travel route candidate creation section 740 combines pre-traveled travel routes acquired by the associated travel route information acquisition section 710 to create a travel route candidate from a departure point to a destination. The travel route candidate creation section 740 corresponds to a "travel route creation section".

The passability determination section 750 compares the specifications of a vehicle requesting creation of a travel route (hereafter also referred to as the creation requestor vehicle) and those of a vehicle (hereafter also referred to as the pre-traveled vehicle) that has actually traveled on (any travel route configuring) the travel route candidate, or employs the surroundings images associated with the position information for the travel route candidate stored in the associated travel route information acquisition section 710, to determine whether or not a travel route candidate would be passable by the creation requestor vehicle. The passability determination section 750 corresponds to a "travelability determination section".

The transmissible travel route information creation section 760 creates transmissible travel route information in which a travel route candidate passable by the creation requestor vehicle configures a travel route. Note that in cases in which no travel route candidates exist that would be passable by the creation requestor vehicle, a travel route creation unavailable signal is created.

Operation

In the vehicle control system 700, the information server 16A acquires associated travel route information and the like transmitted from plural vehicles, such as the vehicles 12A, 12B. For example, the information server 16A creates a travel route according to a travel route creation request signal transmitted from the vehicle 12A and transmits this to the vehicle 12A, thereby enabling autonomous driving of the vehicle 12A.

Vehicle-Side

First, explanation follows regarding processing in which associated travel route information and so on is transmitted from the vehicle 12A.

Figure 13:
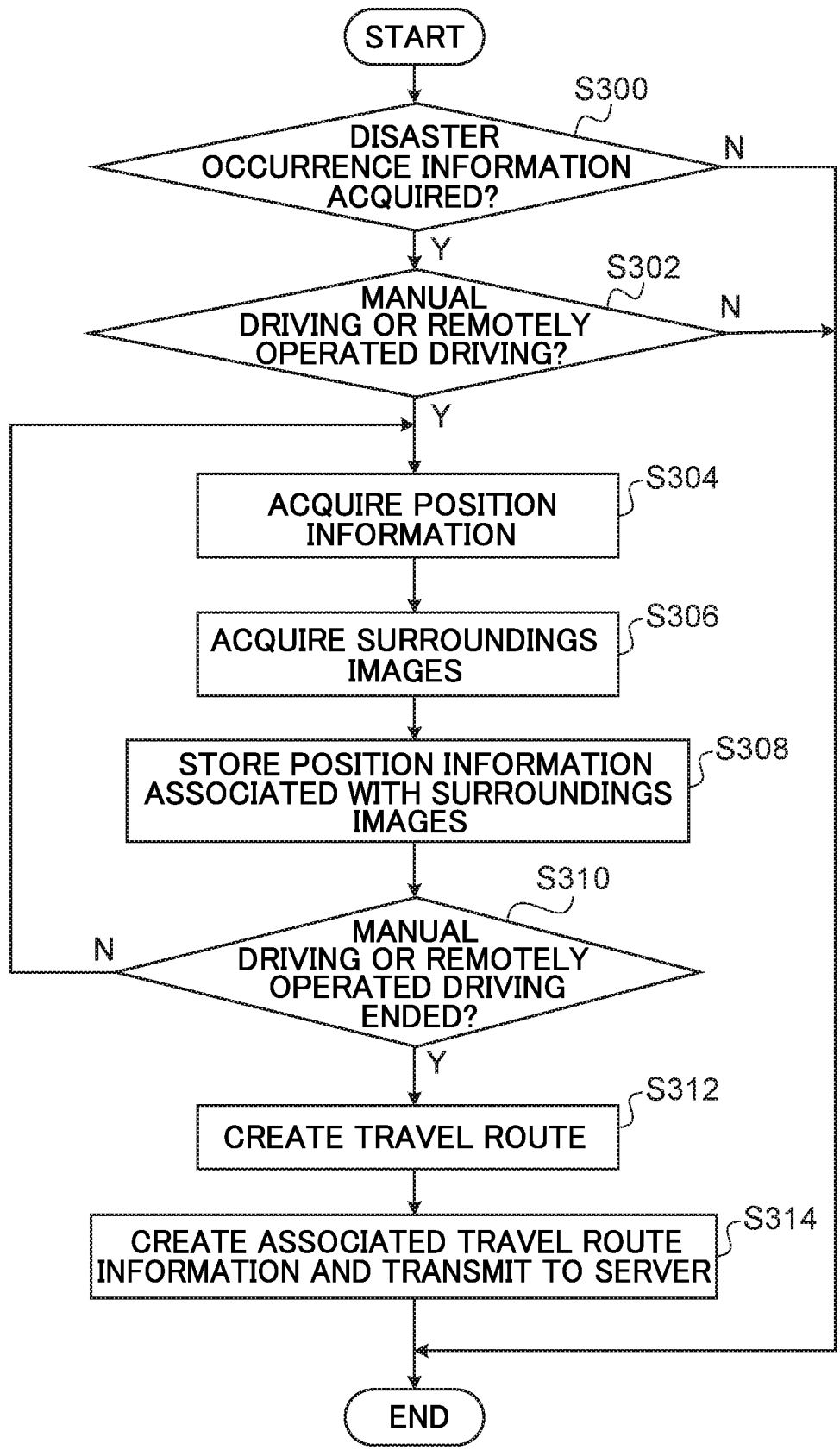
FIG. 13 is a flowchart illustrating an example of associated travel route information creation control according to the second exemplary embodiment.

The CPU 20A of the vehicle 12A determines whether or not disaster occurrence information has been received from the information server 16A (step S300 in FIG. 13 (reference to FIG. 13 will be omitted hereafter)).

In cases in which disaster occurrence information has been received (YES at step S300), the CPU 20A determines whether or not the vehicle 12A is being manually driven or driven by remote operation (step S302).

In cases in which no disaster occurrence information has been received (NO at step S300), as well as cases in which the vehicle 12A is not being manually driven or driven by remote operation (NO at step S302), the CPU 20A ends the processing.

In cases in which the CPU 20A has determined that the vehicle 12A is being manually driven or driven by remote operation at step S302 (YES at step S302), the CPU 20A uses the position information acquisition section 230 to acquire position information at predetermined time intervals, uses the peripheral information acquisition section 210 to acquire surroundings images captured by the camera 23, and stores the surroundings images associated with the capture (vehicle) position (steps S304 to S308).

Next, the CPU 20A determines whether or not the manual driving or the remotely operated driving of the vehicle 12A has ended (step S310). In cases in which this has not ended, the processing of steps S304 to S308 is repeated.

In cases in which the manual driving or the remotely operated driving of the vehicle 12A has ended, the CPU 20A creates a travel route based on the position information acquired at predetermined time intervals by the travel route creation section 240, with an acquisition start time of the position information corresponding to the departure point and an acquisition end time corresponding to the destination (step S312).

The CPU 20A uses the associated travel route information creation section 290 to create the associated travel route information by compiling together the travel route, the surroundings images acquired during travel on the travel route and associated with the position information, and the vehicle type information for the vehicle 12A, and transmits this to the information server 16A through the communication I/F 20E (step S314).

The associated travel route information acquisition section 710 of the information server 16A acquires and stores the associated travel route information.

Although explanation has been given regarding the vehicle 12A, the vehicle 12B is controlled in a similar manner.

Information Server-Side

In cases in which the vehicle 12A is being autonomously driven, the occupant of the vehicle 12A operates a display or the like to create a travel route creation request signal that is transmitted from the CPU 20A to the information server 16. The vehicle type information for the vehicle 12A is appended to the travel route creation request signal.

Figure 14:
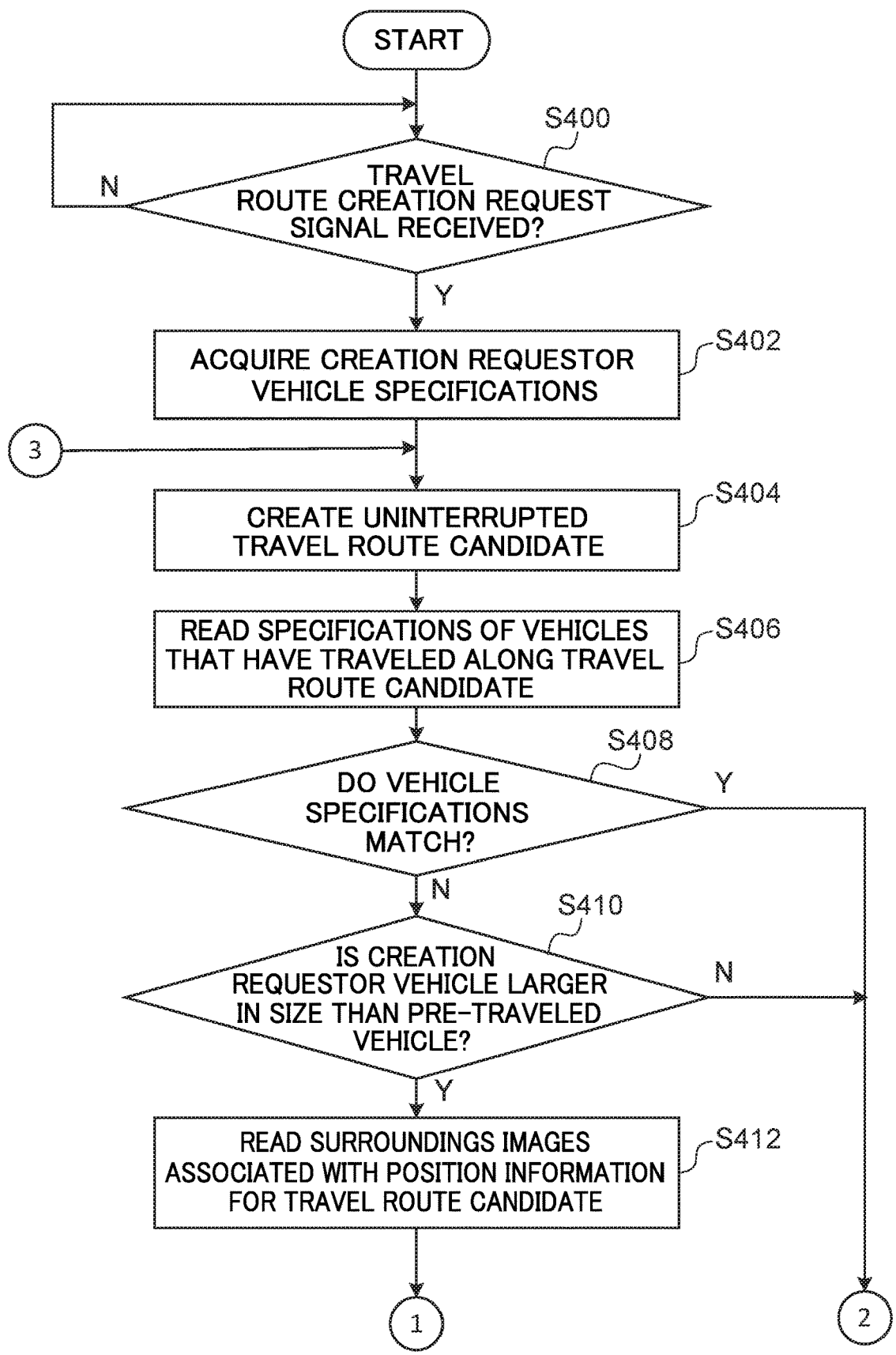
FIG. 14 is a flowchart illustrating an example of travel route creation control according to the second exemplary embodiment.

The CPU 60A of the information server 16A first determines whether or not a travel route creation request signal has been received by the travel route creation request signal acquisition section 730 (step S400 in FIG. 14) (reference to FIG. 14 will be omitted hereafter).

In cases in which a travel route creation request signal has not been received (NO at step S400), the CPU 60A stands by until a travel route creation request signal has been received.

When a travel route creation request signal has been received from a vehicle, for example the vehicle 12A (YES at step S400), the CPU 60A also acquires the vehicle type information of the vehicle 12A, this being the creation requestor vehicle, and thereby acquires specifications such as the vehicle width, vehicle length, and the vehicle height of the vehicle 12A from the vehicle type information stored in the vehicle specification storage section 720 (step S402).

Next, the CPU 60A uses the travel route candidate creation section 740 to create an uninterrupted travel route candidate using the travel routes received from the plural vehicles 12A, 12B (step S404). An uninterrupted travel route refers to a single, continuous route without breaks.

Figure 16A:
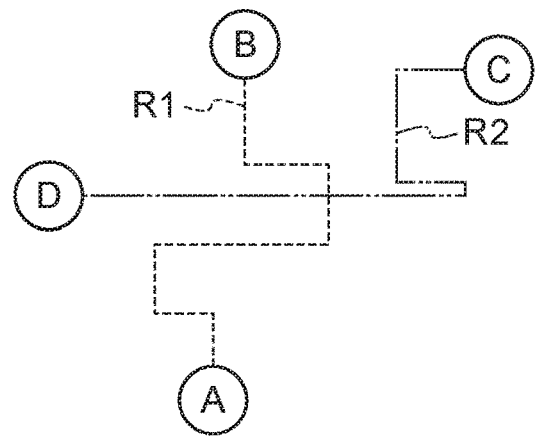
FIG. 16A is a diagram for explaining a travel route candidate creation process.

As an examples, as illustrated in FIG. 16A, a first travel route R1 along which the vehicle 12A has traveled from a site A to a site B, and a second travel route R2 along which the vehicle 12B has traveled from a site C to a site D, are stored in the travel route candidate creation section 740.

Figure 16B:
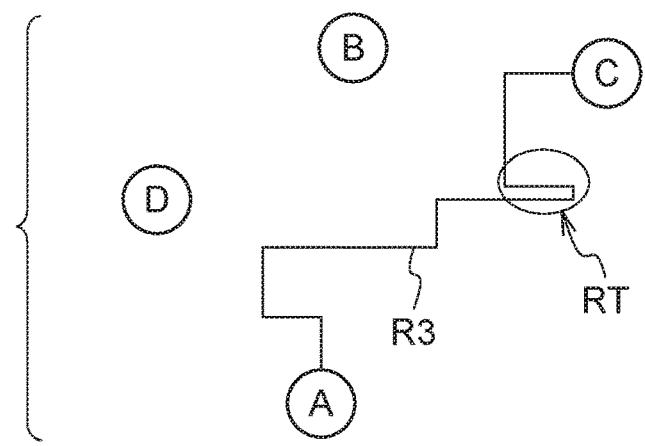
FIG. 16B is a diagram for explaining a travel route candidate creation process.
Figure 16C:
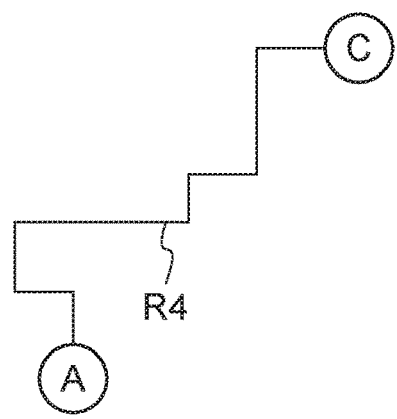
FIG. 16C is a diagram for explaining a travel route candidate creation process.

As illustrated in FIG. 16A and FIG. 16B, in a case in which the departure point indicated by the travel route creation request signal is the site A and the destination thereof is the site C, since the first travel route R1 and the second travel route R2 intersect each other, a travel route candidate R3 from the site A to the site C is created by linking these two travel routes together at an intersection point.

However, as illustrated in FIG. 16B, the travel route candidate R3 includes a backtrack section RT corresponding to a stretch of road where the vehicle 12B has backtracked. Since the backtrack section RT needlessly extends the length of the travel route, the backtrack section RT is eliminated from the travel route candidate R3 in order to create an uninterrupted travel route candidate R4 (see FIG. 16C).

Note that the backtrack section RT encompasses cases of backtracking on a different lane of the same road when the road includes plural lanes. Such sections are thereby eliminated from the uninterrupted travel route.

The uninterrupted travel route candidate is created in this manner. Note that in cases in which it is possible to create plural travel route candidates, these plural travel route candidates are created.

Next, specifications such as the vehicle width, vehicle length, and vehicle height are acquired based on the vehicle type information for each vehicle that has traveled along the travel route candidate (step S406). For example, in the case of the travel route candidate R4, since the travel route candidate R4 is configured by a combination of the first travel route R1 and the second travel route R2, the specifications of the vehicles 12A, 12B that have traveled along the corresponding travel routes are read.

The CPU 60A determines whether or not the specifications of the creation requestor vehicle that has requested travel route creation and the specifications of each pre-traveled vehicle that has traveled along a travel route forming the basis of the travel route candidate match each other (step S408).

In cases in which the respective specifications of the creation requestor vehicle and the pre-traveled vehicle do not match each other (NO at step S408), the CPU 60A determines whether or not the creation requestor vehicle is larger in size than any of the pre-traveled vehicles based on the respective specifications (step S410).

In cases in which the creation requestor vehicle is larger in size than any of the pre-traveled vehicles (YES at step S410), the CPU 60A reads the surroundings images associated with the position information for the travel route candidate from the associated travel route information acquisition section 710 (step S412).

The CPU 60A uses the passability determination section 750 to determine whether or not the creation requestor vehicle would be capable of traveling along the travel route candidate based on the read surroundings images that were captured along the travel route candidate (step S414).

For example, if the pre-traveled vehicle was just barely able to avoid an obstacle by passing between the obstacle and the edge of the road on the travel route candidate, determination is made that this travel route candidate would be impassable for a creation requestor vehicle that has a wider vehicle width. Alternatively, if the pre-traveled vehicle had to pass through a location with a bridge with a low clearance height, determination is made that this travel route candidate would be impassable for a creation requestor vehicle that has a higher vehicle height.

If no locations determined to be impassable for the creation requestor vehicle are present on the travel route candidate based on the surroundings images, the CPU 60A determines that the travel route candidate is passable, and sets the travel route candidate as the travel route (YES at step S414, then step S416).

Note that if the creation requestor vehicle and the pre-traveled vehicle are the same vehicle type (have the same specifications) (YES at step S408), or the creation requestor vehicle is smaller in size than the pre-traveled vehicle (NO at step S410), the CPU 60A does not determine whether or not the creation requestor vehicle would be able to pass along the travel route candidate based on the surroundings images, and sets the travel route candidate as the travel route straight away (step S416). This is because it is obvious that the travel route candidate will be passable for a creation requestor vehicle having the same specifications (size) as the pre-traveled vehicle, or being smaller in size than the pre-traveled vehicle.

The CPU 60A thereby transmits the created travel route information to the creation requestor vehicle through the communication I/F 60E, and ends the processing (step S418).

In cases in which the CPU 60A determines that the travel route candidate is impassable at step S414, the CPU 60A determines whether or not another travel route candidate exists (step S420).

In cases in which another travel route candidate exists (YES at step S420), the CPU 60A repeats the processing of step S406 onward for the other travel route candidate.

In cases in which in which there is no other travel route candidate at step S420 (NO at step S420), the CPU 60A transmits a travel route creation unavailable signal to the creation requestor vehicle through the communication I/F 20E, and ends the processing (step S422).

In this manner, in the vehicle control system 700 according to the present exemplary embodiment, travel routes of plural vehicles, such as the vehicle 12A and the vehicle 12B, are stored on the information server 16A, and these plural travel routes are combined to create a requested travel route, thereby enabling diverse travel routes to be created.

When this is performed, the travel route (candidate) is created so as to be uninterrupted, and so if, for example, a travel route serving forming the basis of the travel route candidate includes a backtrack section RT as in the case of the second travel route R2 (see FIG. 16A), the backtrack section RT is eliminated from the travel route (candidate) (see FIG. 16B and FIG. 16C) to shorten the created travel route (candidate).

Moreover, the vehicle type (specifications) of the creation requestor vehicle and the vehicle type (specifications) of the pre-traveled vehicles that have traveled along the travel route candidate are compared, thereby enabling easy determination as to whether or not the creation requestor vehicle would be capable of passing along the travel route candidate.

Furthermore, in cases in which the creation requestor vehicle is larger in size than the pre-traveled vehicle, determination is made as to whether or not the creation requestor vehicle would be capable of passing along the travel route candidate based on the surroundings images associated with the position information. This prevents a travel route that would be impassable for the creation requestor vehicle from being transmitted from the information server 16A to the creation requestor vehicle, which would result in the creation requestor vehicle being autonomously driven based on the travel route being unable to reach its destination. Namely, this enables the vehicle 12A to be autonomously driven to its destination reliably.

Other

In the first and second exemplary embodiments, explanation has been given regarding a vehicle control system capable of switching between three states, these being manually driven, driven by remote operation, and autonomously driven states. However, the vehicle control system may be configured so as to be capable of switching been two states, these being the manually driven and autonomously driven states, or the driven by remote operation and autonomously driven states.

In cases in which the vehicle control system is only capable of switching being two states, these being the manually driven and autonomously driven states, configuration may be made in which all the configuration elements of the system are installed inside the vehicle.

In the vehicle control systems 10, 700 according to the first and second exemplary embodiments, travel route creation for the vehicle starts following the acquisition of disaster occurrence information. However, there is no limitation thereto. For example, in cases of application other than in the aftermath of a disaster, a configuration may be applied in which travel routes are always stored.

The creation of an uninterrupted travel route in the vehicle control system 700 according to the second exemplary embodiment may also be applied to the first exemplary embodiment. Namely, if a backtrack section is present partway along the outward journey travel route, this backtrack section may be eliminated when creating the return journey travel route.

In the vehicle control system 700 according to the second exemplary embodiment, two travel routes are combined to create a travel route candidate. However, three or more travel routes may be combined to create a travel route candidate, or a travel route candidate may be created from a single travel route.

Likewise, in the vehicle control system 10 according to the first exemplary embodiment plural travel routes of the vehicle 12 (the given vehicle) may be combined to create a travel route.

In the vehicle control system 700 according to the second exemplary embodiment, the specifications of the creation requestor vehicle and the pre-traveled vehicle are compared, and passability determination for the travel route candidate is made using the surroundings images. However, this passability determination does not need to be made. In such cases, the travel route candidate is transmitted to the creation requestor vehicle as the travel route regardless.

The present disclosure provides a vehicle control system, a vehicle controller device and a vehicle control method capable of creating a travel route that can be autonomously driven in cases in which the usability of a normal route is unknown, such as in the aftermath of a large-scale natural disaster.

A first aspect of the disclosure is a vehicle control system that includes: a position information acquisition section that acquires position information of a vehicle in a driving state of a manually driven state or a remotely operated driven state; a travel route storage section that stores a pre-traveled travel route of a vehicle in the manually driven state or the remotely operated driven state based on the position information acquired by the position information acquisition section; and a travel route creation section that creates a travel route on which a vehicle is caused to travel in an autonomously driven state using the travel route stored in the travel route storage section.

In this vehicle control system, the position information of the vehicle traveling in the manually driven state or the remotely operated driven state is acquired, and the pre-traveled travel route of the vehicle in the manually driven state or the remotely operated driven state is stored based on the acquired position information.

The travel route on which the vehicle is caused to travel in the autonomously driven state is created based on the stored travel route.

Accordingly, in cases in which a vehicle is caused to travel by autonomous driving when road conditions are unknown, for example in the aftermath of a large-scale natural disaster, creating the travel route for autonomous driving based on the travel route of a vehicle traveling in the manually driven state or the remotely operated driven state enables a travel route to be created that is at least travelable.

Namely, a travel route for autonomous driving that enables a destination to be reached reliably can be created even when road conditions are unknown.

Note that the "remotely operated driven state" refers to an operator causing the vehicle, the vehicle being an operation target, to travel by performing operation from a position physically separated from the vehicle.

A second aspect is the vehicle control system of the first aspect, wherein: the travel route storage section stores a travel route traveled on an outward journey from a departure point to a destination by one vehicle in either the manually driven state or the remotely operated driven state; and the travel route creation section creates a travel route to return from the destination to the departure point along the travel route of the one vehicle stored in the travel route storage section as a travel route of the one vehicle on a return journey to return to the departure point.

This vehicle control system is applied to vehicles capable of switching between the autonomously driven state and the manually driven state or remotely operated driven state. When such a vehicle travels from a departure point to a destination by manual driving or remotely operated driving, the vehicle control system stores the outward journey travel route and creates a travel route to return from the destination to the departure point along the outward journey travel route as the return journey travel route to return the vehicle to the departure point.

Namely, in a situation in which the road conditions are unknown, the outward journey travel route of travel from the departure point to the destination by manual driving or remotely operated driving is stored, and the return journey travel route created follows the outward journey travel route.

Accordingly, in cases in which a vehicle travels on a round trip from the departure point to the destination when the road conditions are unknown, it is necessary to travel by trial and error by manual driving or remotely operated driving on the outward journey. However, it is possible for the vehicle to travel by autonomous driving on the return journey since the vehicle travels on a travel route created following the passable outward journey.

A third aspect is the vehicle control system of the first aspect, wherein: the travel route storage section and the travel route creation section are independent of a vehicle; the travel route storage section stores pre-traveled travel routes of a plurality of vehicles; and the travel route creation section creates a travel route on which at least one of the plurality of vehicles is caused to travel.

In this vehicle control system, the section that stores the travel route and the section that creates the travel route are provided independently of a vehicle. Moreover, travel routes of plural vehicles are stored, and travel routes are created for plural respective vehicles using the stored travel routes of the plural vehicles.

Accordingly, in cases in which the road conditions are unknown, travel routes that are travelable by the respective vehicles in the autonomously driven state can be created based on the stored pre-traveled travel routes of plural vehicles.

Diverse travel routes can thus be created since travel routes for the respective vehicles can be created based on the stored travel routes of plural vehicles.

A fourth aspect is the vehicle control system of the first or the third aspect, further includes: an imaging section that is installed to the vehicle and that obtains a surroundings image of surroundings of the vehicle; a surroundings image storage section that stores the surroundings image associated with position information acquired by the position information acquisition section at the time when the surroundings image has been obtained; and a travel passability determination section that, in cases in which a vehicle with a different specification from the vehicle that has obtained the surroundings image is to be autonomously driven, refers in advance to a surroundings image associated with position information representing a position on a travel route for the autonomous driving so as to determine whether or not the vehicle with the different specification would be able to pass along this travel route.

In this vehicle control system, when one vehicle travels by manual driving or remotely operated driving, the surroundings image is captured during travel of the vehicle, and the surroundings image is stored associated with the position information.

In cases in which another vehicle having a different specification to the one vehicle is to be autonomously driven on the travel route traveled by the one vehicle, the surroundings image associated with the position information representing a position on a created travel route is referred to in order to determine whether or not the created travel route will be passable by the other vehicle.

This enables a judgement as to whether or not the travel route will be passable to be made even during autonomous driving of a vehicle having a different specification to the one vehicle that has traveled on the travel route by manual driving or remotely operated driving.

A fifth aspect is the vehicle control system of any of the first to the fourth aspect, wherein the travel route creation section creates an uninterrupted travel route from a departure point to a destination based on a pre-traveled travel route stored in the travel route storage section.

The uninterrupted travel route from the departure point to the destination is created based on the stored pre-traveled travel route.

For example, in cases in which only one pre-traveled travel route between the departure point and the destination exists, a travel route following this travel route is created.

However, in cases in which a pre-traveled travel route was found by trial and error, for example due to road conditions being unknown, or in cases in which various locations were called at along the travel route, such as when making deliveries, the travel route may include backtrack sections, resulting in the creation of an unnecessarily long travel route.

Thus, the uninterrupted travel route is created when creating a travel route from a stored pre-traveled travel route. Since a new travel route is created with backtrack sections removed from the pre-traveled travel route, the travel route can be made shorter.

A sixth aspect is the vehicle control system of any of the first to the fifth aspect, further includes: an information acquisition section that acquires disaster occurrence information, wherein the travel route storage section stores a pre-traveled travel route traveled following acquisition of the disaster occurrence information by the information acquisition section.

In this vehicle control system, the pre-traveled travel route is stored from the point when the disaster occurrence information was acquired. Namely, in this vehicle control system the travel route of a vehicle in the manually driven state or the remotely operated driven state is stored from the timing at which a disaster occurs, and a travel route for autonomous driving is created based on this travel route.

Accordingly, creating the travel route for autonomous driving based on the pre-traveled travel route traveled in the aftermath of a disaster enables a travel route that can be reliably traveled by autonomous driving to be created.

A seventh aspect is a vehicle controller device that includes: a position information acquisition section that acquires position information of a vehicle in a driving state of a manually driven state or a remotely operated driven state; and a travel route creation section that refers to a travel route storage section that stores the pre-traveled travel route of the vehicle in the manually driven state or the remotely operated driven state based on the position information acquired by the position information acquisition section, and that creates a travel route on which the vehicle is caused to travel in an autonomously driven state by using the travel route stored in the travel route storage section.

In this vehicle controller device, the position information of the given vehicle traveling in the manually driven state or the remotely operated driven state is acquired, and the pre-traveled travel route of the given vehicle in the manually driven state or the remotely operated driven state is stored based on the acquired position information.

The travel route to cause the given vehicle to travel in the autonomously driven state is created based on the stored travel route.

Accordingly, in cases in which the given vehicle is caused to travel by autonomous driving when road conditions are unknown, for example in the aftermath of a large-scale natural disaster, creating the travel route for autonomous driving based on the travel route of the given vehicle when traveling in the manually driven state or the remotely operated driven state enables a travel route to be created that is at least travelable.

Namely, a travel route for autonomous driving that enables a destination to be reached reliably can be created even when road conditions are unknown.

An eighth aspect is the vehicle controller device of the seventh aspect, wherein: the travel route storage section stores a travel route traveled on an outward journey from a departure point to a destination by the vehicle in either the manually driven state or the remotely operated driven state; and the travel route creation section creates a travel route to return from the destination to the departure point along the travel route of the vehicle stored in the travel route storage section as a travel route of the vehicle on a return journey to return to the departure point.

This vehicle controller device is applied to a vehicle capable of switching between the autonomously driven state and the manually driven state or remotely operated driven state. When such a vehicle travels from a departure point to a destination by manual driving or remotely operated driving, the vehicle controller device stores the outward journey travel route and creates a travel route to return from the destination to the departure point along the outward journey travel route as the return journey travel route to return the vehicle to the departure point.

Namely, in a situation in which the road conditions are unknown, the outward journey travel route by which the given vehicle travels from the departure point to the destination by manual driving or remotely operated driving is stored, and the return journey travel route created follows the outward journey travel route.

Accordingly, in cases in which the given vehicle travels on a round trip from the departure point to the destination when the road conditions are unknown, it is necessary to travel by trial and error by manual driving or remotely operated driving on the outward journey. However, it is possible for the given vehicle to travel by autonomous driving on the return journey since the given vehicle travels on a travel route created following the passable outward journey.

A ninth aspect is the vehicle controller device of the seventh or the eighth aspect, wherein the travel route creation section creates an uninterrupted travel route from a departure point to a destination based on a pre-traveled travel route stored in the travel route storage section.

The uninterrupted travel route from the departure point to the destination is created based on the stored pre-traveled travel route.

For example, in cases in which only one pre-traveled travel route between the departure point and the destination exists, a travel route following this travel route is created.

However, in cases in which a pre-traveled travel route was found by trial and error, for example due to road conditions being unknown, or in cases in which various locations were called at along the travel route, such as when making deliveries, the travel route may include backtrack sections, resulting in the creation of an unnecessarily long travel route.

Thus, the uninterrupted travel route is created when creating a travel route from a stored pre-traveled travel route. Since a new travel route is created with backtrack sections removed from the pre-traveled travel route, the travel route can be made shorter.

A tenth aspect is the vehicle controller device of any one of the seventh to the ninth aspect, that further includes: an information acquisition section that acquires disaster occurrence information, wherein the travel route storage section stores a pre-traveled travel route traveled following acquisition of the disaster occurrence information by the information acquisition section.

In this vehicle controller device, the pre-traveled travel route is stored from the point when the disaster occurrence information was acquired. Namely, in this vehicle controller device the travel route of the given vehicle in the manually driven state or the remotely operated driven state is stored from the timing at which a disaster occurs, and a travel route for autonomous driving is created based on this travel route.

Accordingly, creating the travel route for autonomous driving based on the pre-traveled travel route traveled in the aftermath of a disaster enables a travel route that can be reliably traveled by autonomous driving to be created.

The vehicle control system and vehicle controller device described above are capable of creating a travel route that can be autonomously driven even in cases in which road conditions are unknown.

The invention claimed is:

1. A vehicle control system, comprising:
    a first processor that is configured to acquire position information of a vehicle in a driving state that is a manually driven state or a remotely operated driven state; and
    a second processor that is configured to:
        acquire disaster occurrence information;
        store, in a first memory, a pre-traveled travel route that has been traveled following acquisition of the disaster occurrence information and whether the pre-traveled travel route has been traveled in the manually driven state or the remotely operated driven state; and
        in a case in which a first travel route including a departure and a second travel route including a destination intersect, create a travel route on which the vehicle is caused to travel in an autonomously driven state a plurality of times, by linking the first travel route and the second travel route at an intersection point, the first travel route and the second travel route being among a plurality of travel routes.

2. The vehicle control system of claim 1, wherein the second processor is configured to:
    store, in the first memory, a travel route traveled, on an outward journey from the departure to the destination, by the vehicle in either the manually driven state or the remotely operated driven state, and
    create a travel route to return from the destination to the departure point along the travel route of the vehicle stored in the first memory, as a travel route of the vehicle on a return journey to return to the departure.

3. The vehicle control system of claim 1, wherein the first processor and the second processor are an identical processor.

4. The vehicle control system of claim 1, wherein:
    the second processor is independent of the vehicle, and
    the second processor is configured to:
        store, in the first memory, pre-traveled travel routes of a plurality of vehicles, and
        create a travel route on which at least one of the plurality of vehicles is caused to travel.

5. The vehicle control system of claim 1, further comprising an imaging device that is provided at the vehicle and is configured to obtain a surroundings image of surroundings of the vehicle,
wherein the first processor is configured to:
store, in a second memory, the surroundings image associated with the acquired position information at the time when the surroundings image has been obtained, and
in a case in which a different vehicle with a specification that is different from that of the vehicle that obtained the surroundings image is to be autonomously driven, to refer in advance to a surroundings image associated with position information representing a position on a travel route for the autonomous driving, so as to determine whether or not the different vehicle would be able to pass along the travel route for autonomous driving.

6. The vehicle control system of claim 1, wherein the second processor is configured to create an uninterrupted travel route from the departure to the destination based on a pre-traveled travel route stored in the first memory.

7. The vehicle control system of claim 1, wherein the vehicle control system is further configured to autonomously drive the vehicle along the travel route stored in the memory autonomously the plurality of times.

8. The vehicle control system of claim 1, wherein the disaster is a large-scale natural disaster.

9. A vehicle controller device, comprising:
a memory; and
a processor, the processor being configured to:
acquire position information of a vehicle, on which the vehicle controller device is mounted, in a driving state that is a manually driven state or a remotely operated driven state;
acquire disaster occurrence information;
refer to a memory configured to store a pre-traveled travel route that has been traveled following acquisition of the disaster occurrence information and whether the pre-traveled travel route has been traveled in the manually driven state or the remotely operated driven state, and
in a case in which a first travel route including a departure and a second travel route including a destination intersect, create a travel route on which the vehicle is caused to travel in an autonomously driven state a plurality of times, by linking the first travel route and the second travel route at an intersection point, the first travel route and the second travel route being among a plurality of travel routes.

10. The vehicle controller device of claim 9, wherein:
the processor is configured to:
store, in the memory, a travel route traveled, on an outward journey from the departure to the destination, by the vehicle in either the manually driven state or the remotely operated driven state; and
create a travel route to return from the destination to the departure along the travel route of the vehicle stored in the memory, as a travel route of the vehicle on a return journey to return to the departure point.

11. The vehicle controller device of claim 9, wherein the processor is configured to create an uninterrupted travel route from a departure point to the destination based on a pre-traveled travel route stored in the memory.

12. A vehicle control method, comprising,
by a processor:
acquiring position information of a vehicle in a driving state that is a manually driven state or a remotely operated driven state;
acquiring disaster occurrence information;
refer to a memory configured to store a pre-traveled travel route that has been traveled following acquisition of the disaster occurrence information and whether the pre-traveled travel route has been traveled in the manually driven state or the remotely operated driven state; and
in a case in which a first travel route including a departure and a second travel route including a destination intersect, creating a travel route on which the vehicle is caused to travel in an autonomously driven state a plurality of times, by linking the first travel route and the second travel route at an intersection point, the first travel route and the second travel route being among a plurality of travel routes.

13. The vehicle control method of claim 12, further comprising,
by the processor:
storing, in the memory, a travel route traveled, on an outward journey from the departure to the destination, by the vehicle in either the manually driven state or the remotely operated driven state; and
creating a travel route to return from the destination to the departure along the travel route of the vehicle stored in the memory, as a travel route of a given vehicle on a return journey to return to the departure point.

14. The vehicle control method of claim 12, further comprising, by the processor, creating an uninterrupted travel route from the departure to the destination based on a pre-traveled travel route stored in the memory.

* * * * *